United States Patent [19]

Ogawa

[11] Patent Number: 5,049,776
[45] Date of Patent: Sep. 17, 1991

[54] APPARATUS FOR DETECTING ROTATION

[75] Inventor: Naoki Ogawa, Nagoya, Japan

[73] Assignee: Aisin Seiki Kabushiki Kaisha, Asahi, Japan

[21] Appl. No.: 433,224

[22] Filed: Nov. 8, 1989

[30] Foreign Application Priority Data

Nov. 9, 1988 [JP] Japan .................. 63-283157
Nov. 9, 1988 [JP] Japan .................. 63-283158

[51] Int. Cl.⁵ .......................................... H01L 41/08
[52] U.S. Cl. ................................... 310/333; 310/339; 310/321; 310/316
[58] Field of Search ............... 310/321, 323, 329, 333, 310/316; 73/505, 517 AV, 517 A

[56] References Cited

U.S. PATENT DOCUMENTS

| | | | |
|---|---|---|---|
| 2,927,300 | 3/1960 | Smith | 310/333 X |
| 3,141,100 | 7/1964 | Hart | 310/329 X |
| 4,264,838 | 4/1981 | Jacobson | 310/329 |
| 4,489,609 | 12/1984 | Burdess et al. | 310/333 X |
| 4,538,461 | 9/1985 | Juptner et al. | 310/333 X |
| 4,653,325 | 3/1987 | Hojo et al. | 310/329 X |
| 4,689,992 | 9/1987 | Strachan | 73/505 |
| 4,905,107 | 2/1990 | Klein | 310/333 X |

Primary Examiner—Mark O. Budd
Attorney, Agent, or Firm—Burns, Doane, Swecker & Mathis

[57] ABSTRACT

A rotation-detecting apparatus includes a U-shaped support member, a rod at least one end of which is held to the support member, a vibrating sheet mounted to the rod, piezoelectric ceramic sheets mounted on the vibrating sheet, a torsion detector for detecting the rotation of the vibrating member relative to the rod, and an oscillator circuit for activating the piezoelectric sheets to vibrate the vibrating sheet. The Coriolis force produced on the vibrating sheet is converted into a twist of the rod and detected.

14 Claims, 10 Drawing Sheets

APPARATUS FOR DETECTING ROTATION

FIELD OF THE INVENTION

The present invention relates to a rotation-detecting apparatus which detects rotation and produces a signal corresponding to the detected rotation.

BACKGROUND OF THE INVENTION

Description of the Related Art

Figures 2, 3A, 3B:
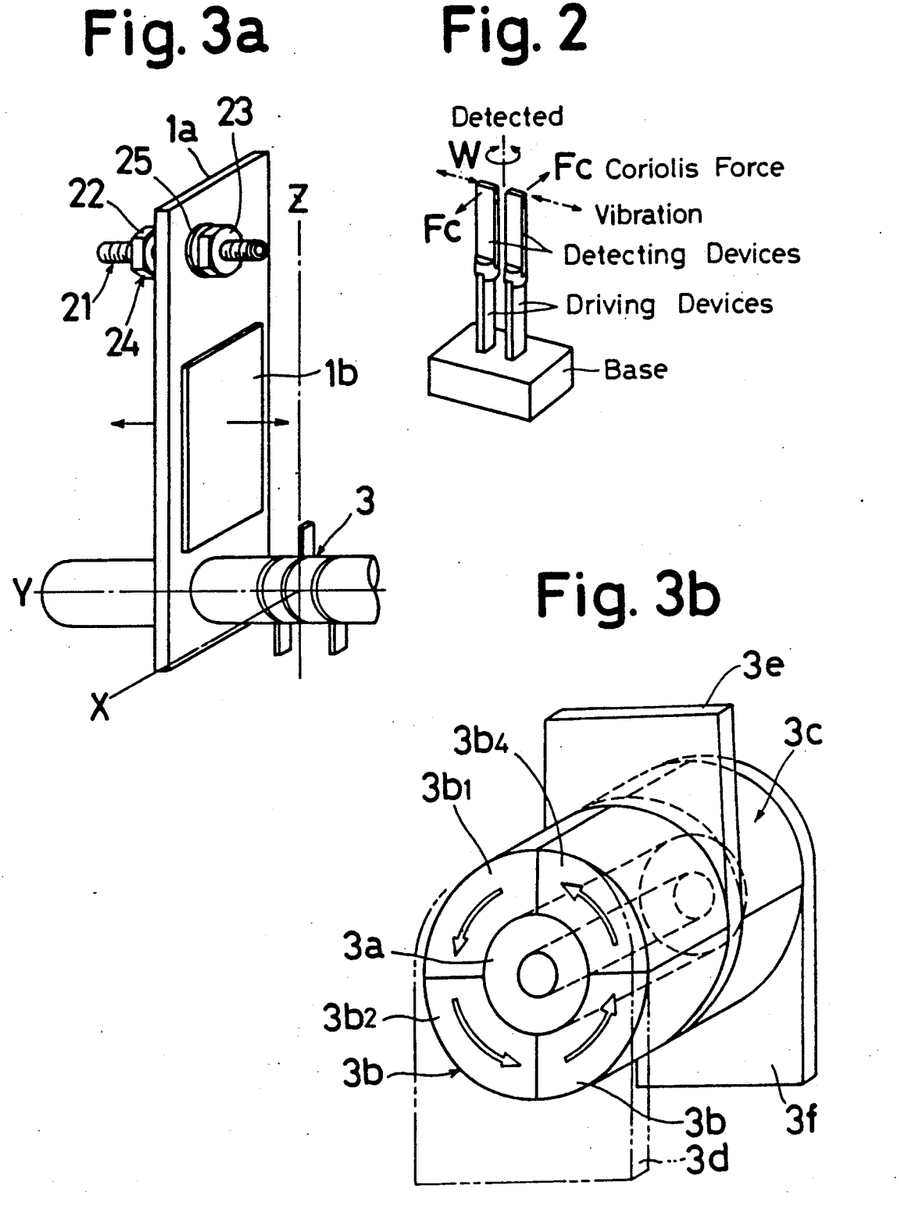
FIG. 2 is a perspective view of the prior art rotation-detecting apparatus according to the invention.
FIG. 3a is an enlarged perspective view of a portion of the apparatus shown in FIG. 1.
FIG. 3b is an enlarged perspective view of another portion of the apparatus shown in FIG. 1.

A conventional gyroscope which produces a signal corresponding to its rotation is generally designed as shown in FIG. 2. In particular, the gyroscope comprises a mechanical vibrator resembling a tuning fork in appearance. This vibrator is activated by activating elements so that the vibrator may be constantly subjected to vibration. Thus, an inertial force is produced. The gyroscope further includes a base and detecting elements mounted to the vibrator. As the base is rotated, a force, known as the Coriolis force acts on the vibrator. This Coriolis force is detected by the detecting elements. Since the Coriolis force varies according to the angular velocity, the angular velocity of the rotation can be determined by detecting warpage of the tuning fork with piezoelectric devices, the warp being caused by the Coriolis force.

The above-described gyroscope has various drawbacks discussed as follows.

(1) Since the gyroscope responds to rectilinear acceleration as well as to angular velocity, error occurs in detecting the angular velocity.

(2) The accuracy of the gyroscope is temperature dependent. Specifically, piezoelectric devices, polarized in the direction of thickness of the tuning fork, are used as the detecting elements which detect the warp of the tuning fork in the direction of thickness. Electric potential develops on the polarized surface of the tuning fork according to a temperature change by the piezoelectric effects. However, electrodes must be installed on the polarized surface in order to detect the warpage. Therefore, the signal developed across the electrodes varies with temperature.

(3) The vibration which activates the tuning fork is transmitted to the piezoelectric devices. Accordingly, the vibration is detected as noise.

(4) Output characteristics of the gyroscope vary greatly from apparatus to apparatus. For example, the characteristics are affected by the thickness of the adhesive used to bond the piezoelectric devices to the tuning fork and also by strain. Also, as discussed the characteristics drift or are otherwise effected by temperature.

(5) Numerous laborious operations are needed to manufacture the gyroscope and, therefore, it cannot be manufactured efficiently. For instance, it is difficult to adjust the resonance frequency of the tuning fork and the sensitivity. Further, it is difficult to bond the piezoelectric devices to a metal. In addition, it is difficult to electrically connect the piezoelectric devices with the circuit.

(6) The accuracy of the device is poor. Especially, the error increases in the region where the angular velocity is of small magnitude.

SUMMARY OF THE INVENTION

Accordingly, it is an object of the invention to provide a rotation detecting apparatus which produces a signal exactly in response to angular velocity.

The above object is achieved in accordance with the invention by a rotation-detecting apparatus which includes a support member; a connector member at least one end of which is supported on the support member; a vibrating member in the form of a sheet or plate and supported on the connector member; a driving means rigidly fixed to the vibrating member; a torsion-detecting means for detecting rotation between the connector member and the vibrating member; and an activating means that activates the driving means to vibrate the vibrating member.

The above object is also achieved by a rotation-detecting arrangement which includes a support member; a rodlike connector member at least one end of which is supported on the connector member; a vibrating member having at least a pair of vibrating portions fixed to the connector member and disposed on opposite sides of the connector member, each vibrating portion in the form of a sheet or plate; a plurality of driving means rigidly fixed to their respective vibrating portions of the vibrating member; a torsion-detecting means for detecting rotation between the connector member and the vibrating member; and an activating means which causes the vibrating portions of the vibrating member to vibrate axially of the connector member.

The vibrating portions of the vibrating member are caused to vibrate constantly in the direction of thickness, i.e., axially of the connector member. When this apparatus is rotated about the axis of the connector member, the Coriolis force acts on the vibrating portions in a direction perpendicular to the axis of vibration according to the angular velocity of the vibrating portions. This force rotates the vibrating member about the axis of the connector member and, therefore, the vibrating member vibrates in such a direction as to rotate relative to the connector member. The torsional force acting between the connector member and the vibrating member is detected to measure the Coriolis force. That is, a precise signal corresponding to the angular velocity ω is obtained.

The aforementioned object is also achieved by a rotation-detecting apparatus which includes a support member; a rodlike connector member at least one end of which is supported on the support member; a vibrating member supported on the connector member and being in the form of a sheet or plate; a driving means rigidly fixed to the vibrating member; a torsion-detecting means which detects the torsional strain of the connector member; and an activating means that activates the driving means to vibrate the vibrating member axially of the connector member.

The vibrating member is constantly vibrated in the direction of thickness, i.e., axially of the connector member. When this apparatus is rotated along an axis perpendicular to the axis of the connector member, Coriolis force acts on the vibrating member according to the angular velocity of the vibrating member. The Coriolis force acts in a direction so as to rotate the connector member about the axis of the connector member. Therefore, if one end of the connector member is held, a torsional force acts on the connector member. This torsional force is detected to measure the Coriolis force. That is, a precise signal corresponding to the angular velocity ω is obtained.

BRIEF DESCRIPTION OF THE DRAWINGS

FIG. 10b is an equivalent circuit diagram of the torsion detector 3 shown in FIG. 10a;

DETAILED DESCRIPTION OF THE INVENTION

Figure 1:
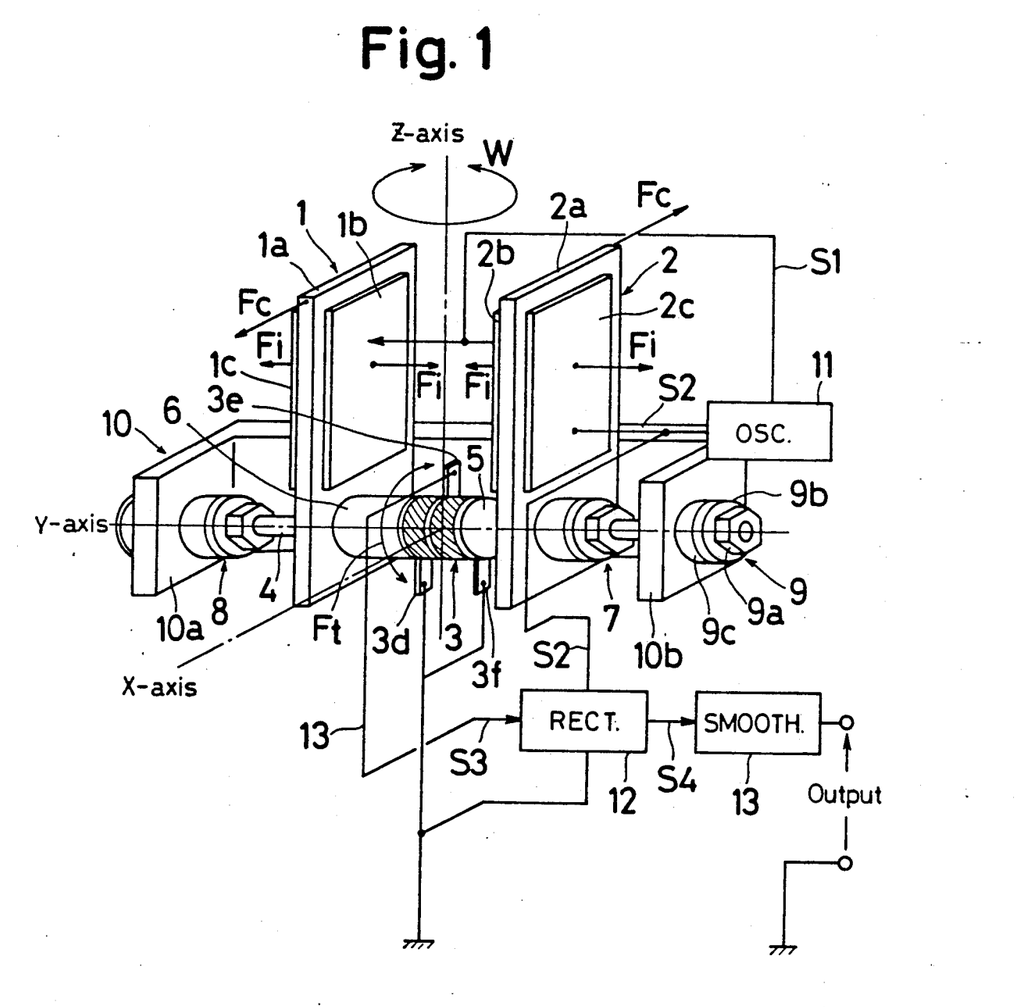
FIG. 1 is a perspective view of a rotation-detecting apparatus according to the invention.

Referring to FIG. 1, there is shown a rotation-detecting apparatus according to the invention. X, Y, and Z-axes are mutually perpendicular to each other. The apparatus comprises a support member 10, a rod 4 of a circular cross section, a torsion detector 3 mounted on the central portion of the rod 4, and tuning forks 1 and 2.

The support member 10 is made of a metal plate and bent into a U-shaped form. The metallic rod 4 is threaded over its whole outer surface and extends from one end 10a of the support member 10 to the other end 10b. One end of the rod 4 is fixed to both sides of the support member 10 and end 10a of the support member 10 by fixing mechanisms 8. The other end of the rod 4 is fixed to both sides of the support member 10 at the other end 10b by fixing mechanisms 9. In this example, the rod 4 extends along the Y-axis.

Each fixing mechanism 9 includes a lock nut 9a, a washer 9b, and an insulator 9c. The lock nut 9a is screwed to the thread on the rod 4. The fixing mechanisms 8 and fixing mechanisms 7 (described later) are similar to the fixing mechanisms 9.

An insulator 6 is in contact with one end of the torsion detector 3 in the direction of the thickness of the detector, i.e., in the direction of the Y-axis. The turning fork 1 is in contact with one end surface of the insulator 6. A similar insulator 5 is in contact with the other end surface of the torsion detector 3. The tuning fork 2 is in contact with the insulator 5. The rod 4 extends through openings (not shown) formed in the torsion detector 3, the insulators 5, 6, the insulators 1 and 250 to hold them.

One fixing mechanism 7 is mounted to the tuning fork 1 in an opposite relation to one end 10a of the support member 10. Another fixing mechanism 7 is mounted to the tuning fork 2 and disposed opposite to the other end 10b of the support member 10. By tightening the fixing mechanisms 7, the tuning fork 1, the insulator 6, the torsion detector 3, the insulator 5, and the tuning fork 2 are pressed together from opposite sides to secure them together. However, they can be slightly twisted about the Y-axis.

The tuning fork 1 is equipped with a metallic rectangular vibrating sheet 1a having a longitudinal direction extending in the direction of the Z-axis. The vibrating sheet 1a is held by the rod 4 near one longitudinal end thereof. Rectangular piezoelectric ceramic sheets 1b and 1c are rigidly fixed to opposite sides of the vibrating sheet 1a in the direction of are polarized in their direction of thickness. If alternating voltage is applied to the piezoelectric ceramic sheets, strain is created in the direction of thickness. Conversely, if they receive strain in their direction of thickness, a voltage is produced.

The other tuning fork 2 comprises a vibrating sheet 2a, piezoelectric ceramic sheets 2b, 2c rigidly fixed to opposite surfaces of the vibrating sheet in the same way as the tuning fork 1.

The structure of the torsion detector 3 is shown in FIG. 3b. This detector 3 comprises an insulating tube 3a, piezoelectric members 3b, 3c mounted on the outer periphery of the tube 3a, and electrodes 3d, 3e, 3f. The piezoelectric member 3b is sandwiched between the electrodes 3d and 3e. Similarly, the piezoelectric member 3c is sandwiched between the electrodes 3e and 3f. The rod 4 extends through the insulating tube 3a.

The piezoelectric member 3b is cylindrical in shape as shown and includes four arc-shaped piezoelectric elements $3b_1$, $3b_2$, $3b_3$ and $3b_4$ each of which extends an arc of 90°. These piezoelectric elements are polarized circumferentially as indicated by the arrows. The other piezoelectric member 3c is similar in structure to the piezoelectric member 3b. When the piezoelectric members 3b and 3c receive a force acting to twist them with respect to the axis of the rod 4, or in the direction of the Y-axis, they produce a voltage corresponding to the magnitude of the force.

Referring to FIG. 1, electrodes 3d and 3f are connected with each other and grounded. The output signal S3 from the torsion detector 3 is taken from the electrode 3e disposed midway between the two piezoelectric members 3b and 3c. Since the ends of the detector 3 which are opposite in the direction of thickness are grounded, no problem occurs if the insulation of these portions from other members is not specially considered or otherwise provided. In this example, therefore, any special electrical insulating member is disposed neither between the electrode 3d and the insulator 6 nor between the electrode 3f and the insulator 5. An electrical equivalent circuit of the torsion detector 3 is shown in FIG. 4b.

If the lock nut of the fixing mechanism 7 cooperates with the thread on the rod 4 to prevent the tuning forks 1, 2 and the torsion detector 3 from moving in the direction of the Y-axis in FIG. 1, then the thicknesses of the coupled surfaces have substantially no difference, unlike the case in which the components are bonded with adhesive. Consequently, the detecting characteristics differ little from apparatus to apparatus of the invention. In this example, the insulators 5, 6, 9c, etc. prevent mechanical vibration from being transmitted to unwanted locations.

Referring to FIG. 1, the output signal S1 from the oscillator circuit 11 is applied to the piezoelectric ceramic sheet 1b of the tuning fork 1 and to the piezoelectric ceramic sheet 2b of the tuning fork 2 to activate them. The output signal S2 from the piezoelectric ceramic sheet 2c of the tuning fork 2 is fed back to the oscillator circuit 11.

Figure 4A:
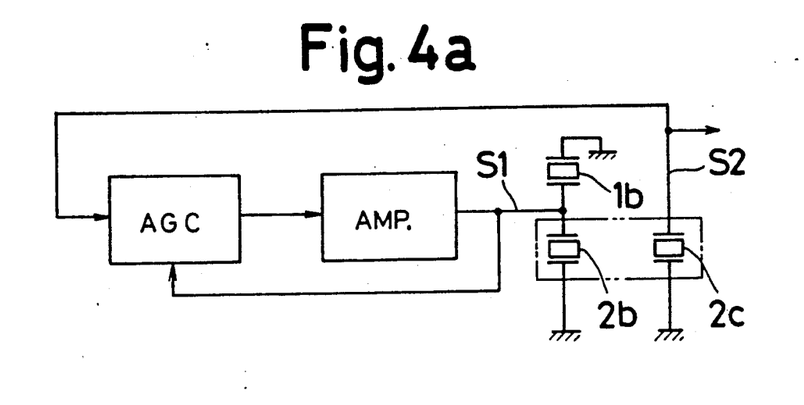
FIG. 4a is a block diagram of the oscillator circuit 11 and the piezoelectric ceramic sheets of the apparatus shown in FIG. 1.
Figure 4B:
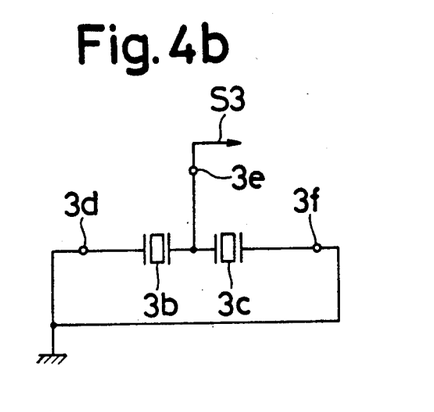
FIG. 4b is an equivalent circuit diagram of the torsion detector 3 of the apparatus shown in FIG. 1.

The oscillator circuit 11 is shown in FIG. 4a and delivers a sinusoidal activating signal S1 which is regulated in frequency and amplitude. The signal S2 fed back to the oscillator circuit 11 is utilized to stabilize the oscillation and the vibration of the tuning forks. The signal S2 is also used to synchronize the rectifier circuit 12 that processes the detected signal.

The two piezoelectric ceramic sheets 1b and 2b to which the sinusoidal activating signal S1 is applied form the oscillator circuit 11 and are polarized in their direction of thickness so the signal S1 produces strain in the direction of thickness. Since the direction of the strain reverses periodically, vibration takes place in the direction of thickness. Resonating with this vibration, the vibrating sheets 1a and 2a, or the tuning forks 1 and 2, vibrate. Therefore, the tuning forks 1 and 2 vibrate in directions indicated by the arrows Fi in FIG. 1, i.e., in the direction of the Y-axis. The tuning forks 1 and 2 vibrate in opposite directions. That is, when the fork 1 deflects toward the fork 2, the fork 2 also deflects toward the fork 1. When the fork 1 deflects away from the fork 2 the fork 2 also deflects away from the fork 1.

When the tuning forks 1 and 2 are constantly vibrated in this way, an inertial force acts on this detection apparatus. If the apparatus rotates about the Z-axis, Coriolis forces Fc having a magnitude corresponding to the angular velocity of the rotation act on the forks 1 and 2 in the direction of the X-axis. The force Fc acting on the fork 1 is opposite in sense to the force Fc acting on the fork 2. That is, when the force Fc acting on the fork 1 is directed in the forward direction of the X-axis, the force Fc acting on the fork 2 is directed in the negative direction in the X-axis.

Accordingly, as the apparatus rotates about the Z-axis, oppositely directed forces which rotate about the Y-axis are applied to the two faces of the torsion detector 3 that are opposite in the direction of thickness and connected to the tuning forks 1 and 2 via the insulators 6 and 5, respectively. As a result, the detector 3 is twisted along the Y-axis. Since the torsion detector 3 is polarized circumferentially as described previously, when it is twisted, it delivers an electrical signal corresponding to the twisting force. Therefore, the amplitude of the signal S3 delivered from the torsion detector 3 corresponds to the angular velocity about the Z-axis. As shown in FIG. 1, the signal S3 produced from the electrode 3e in the center of the torsion detector 3 is applied to the input terminal of the rectifier circuit 12. The feedback signal S2 is applied to the synchronizing input terminal of the oscillator circuit 12.

Figure 4C:
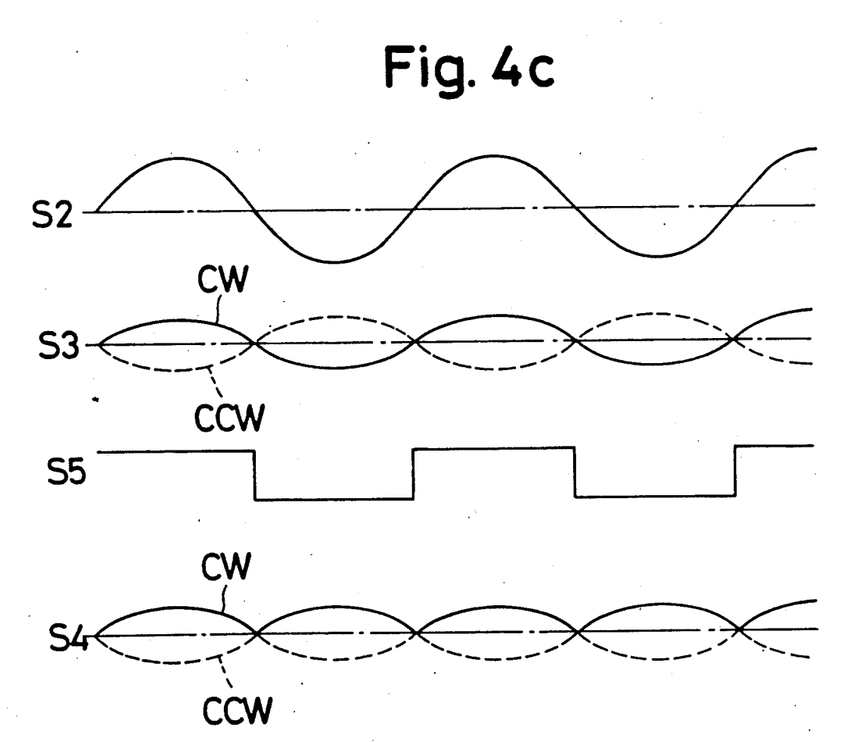
FIG. 4c is a timing chart illustrating the operation of the rectifier circuit 12 of the apparatus shown in FIG. 1.

The operation of the rectifier circuit 12 is next described by referring to FIG. 4c. The signal S3 delivered from the torsion detector 3 is a sinusoidal wave and appears in synchronism with the feedback signal S2. The phase of the signal S3 is reversed when the rotation about the Z-axis is reversed, e.g., when the rotation is switched from a clockwise direction (CW) to a counterclockwise direction (CCW). The rectifier circuit 12 produces a rectangular wave S5, based on the feedback signal S2, processes the signal S3 in synchronism with the rectangular wave, and delivers a rectified signal S4.

The rectified waveform S4 takes positive polarity when the rotation is in the clockwise direction (CW) and assumes negative polarity when the rotation is in the counterclockwise direction (CCW), as shown in FIG. 4c.

The output signal S4 from the rectifier circuit 12 is averaged by a smoothing circuit 13 to produce a DC voltage. Accordingly, the DC voltage delivered from the smoothing circuit 13 has an amplitude and a direction coincident with the amplitude and the direction of the angular velocity.

Figure 5:
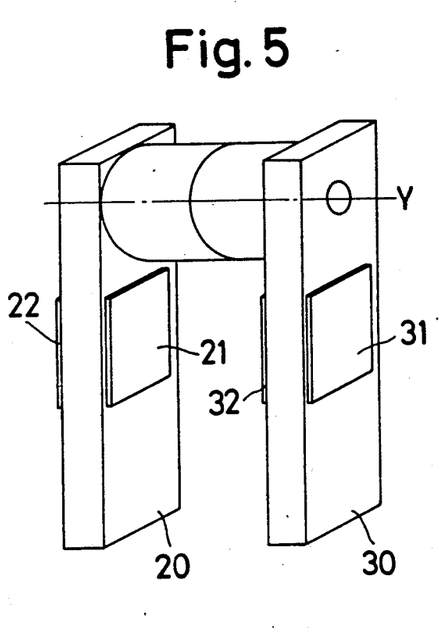
FIGS. 5, 6, 7 are perspective views of various tuning forks according to the invention.
Figure 6:
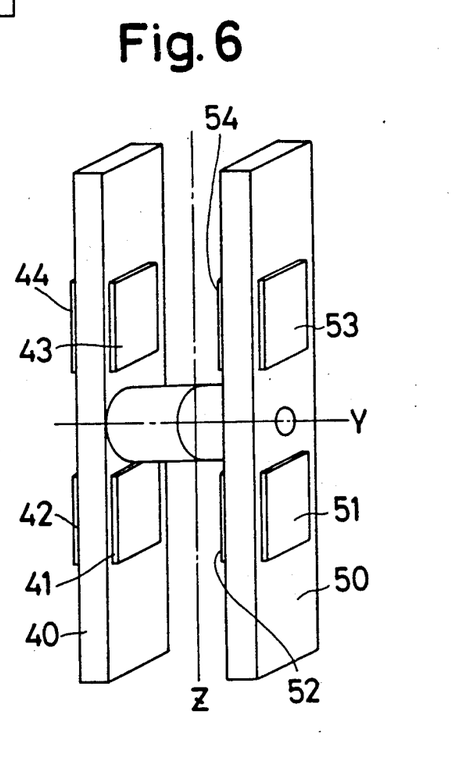
Figure 7:
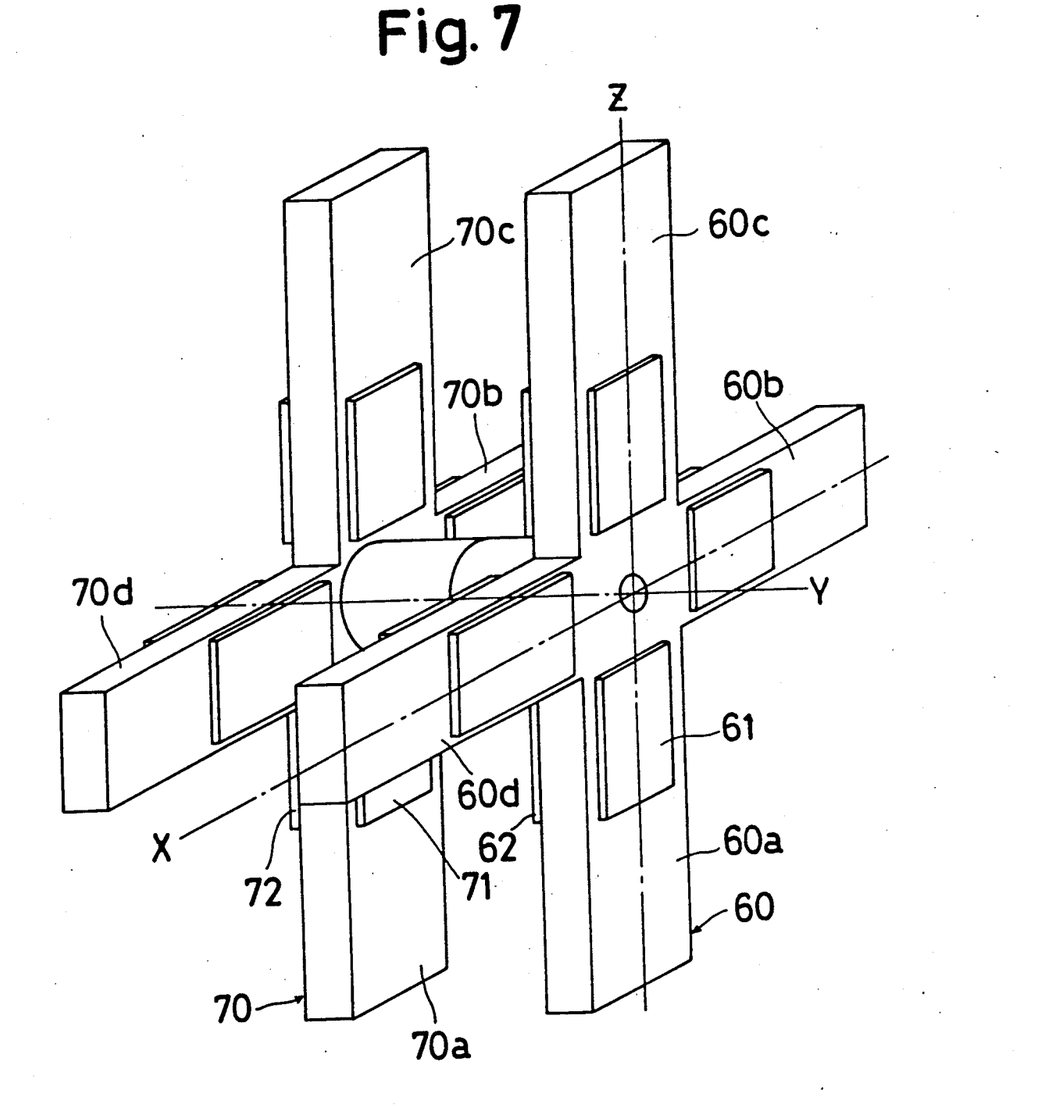

Modified examples of the tuning forks are shown in FIGS. 5, 6 and 7. In the example shown in FIG. 5, tuning forks have vibrating sheets 20 and 30, respectively, to which piezoelectric ceramic sheets 21, 22 and 32, 32 are respectively installed. The ceramic sheets 21 and 22 are located in the center of the vibrating sheet 20. The ceramic sheets 31 and 32 are disposed in the center of the vibrating sheet 30. In this configuration, the tuning forks vibrate in a well-balanced condition, and the waveform of the vibration approaches a sinusoidal waveform.

In the example shown in FIG. 6, vibrating sheets 40 and 50 are supported in the centers of their respective tuning forks. Piezoelectric ceramic sheets 41, 42, 43, 44 are installed on the vibrating sheet 40. The ceramic sheets 41 and 43 are symmetrically arranged with respect to the axis of the vibrating sheet. Also, the ceramic sheets 42 and 44 are symmetrically arranged with respect to the axis of the vibrating sheet. These piezoelectric sheets are so arranged that the longitudinal dimension of the vibrating sheet 40 is trisected by them, taking account of the balance of the vibration. Specifically, the distance between the lower end of the vibrating sheet 40 and the center, or the center of gravity, of the piezoelectric ceramic sheet 41, the distance between the center of the ceramic sheet 41 and the center of the ceramic sheet 43, and the distance between the center of the ceramic sheet 43 and the upper end of the vibrating sheet 40 are all equal. This gives rise to desired vibration. The other vibrating sheet 50 and piezoelectric ceramic sheets installed on it are fabricated similarly.

In the example shown in FIG. 7, a vibrating crisscross sheet 60 comprises two vibrating portions 60b, 60d extending along the X-axis and two vibrating portions 60a, 60c extending along the Z-axis. A piezoelectric ceramic sheet 61 or 62 is installed on each vibrating portion. In the same way as the vibrating sheet 60, a vibrating sheet 70 takes a crisscross form and includes vibrating portions each having a piezoelectric ceramic sheet 71 or 72 installed on it. The piezoelectric sheets are located in the same positions as in the example of FIG. 6. The ceramic sheets 62 and 71 are used for activating purposes, while the ceramic sheets 61 and 72 are employed to detect vibration. Of course, their roles can be interchanged.

In the above examples, two tuning forks are used. Where only one tuning fork is used, it is possible to apply a twisting force to the torsion detector 3. The embodiment will also function if one tuning fork is omitted. Also, the invention can be carried out if at least one end of the rod 4 is supported by the support member 10. Further, the insulators 5 and 6 described above can be omitted. In this case, the faces of the torsion detector 3 which are opposite in the direction of thickness are in direct contact with the surfaces of the tuning forks 1 and 2.

As shown in FIG. 3a, a screw 21, washers 34, 5, lock nuts 22, 23 for fixing the screw 21 to a vibrating sheet 1a may be mounted close to the front end of the vibrating sheet 1a. This arrangement permits the center of gravity of the tuning fork to be varied by moving the position of the screw 21. Hence, the balance of the vibration can be adjusted. Also, this configuration makes it much simpler to adjust the vibration of tuning forks than theretofore.

Figure 8:
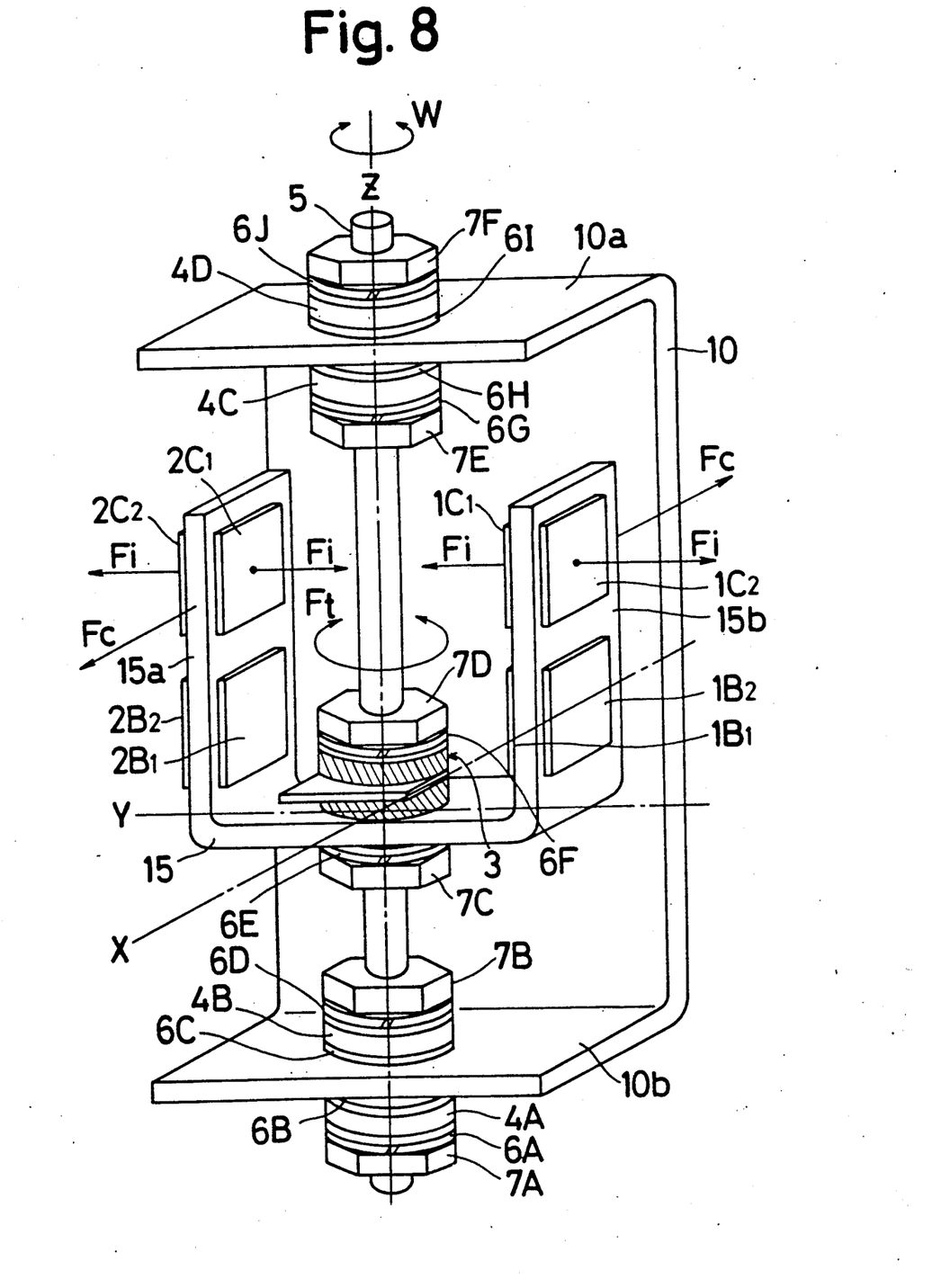
FIG. 8 is a perspective view of another rotation detecting apparatus according to the invention.

Referring next to FIG. 8, there is shown another rotation-detecting apparatus according to the invention. This apparatus comprises a support member 10, a metallic rod 5 of a circular cross section, a torsion detector 3 mounted on the central portion of the rod 5, and a tuning fork also mounted on the central portion of the rod 5. In FIG. 8, X, Y, and Z-axes are mutually perpendicular to each other. The support member 10 is fabricated by bending a metal plate into a U-shaped form. The rod 5 is threaded over its whole outer periphery. The rod 5 extends through the support member 10 from its one end 10a to its other end 10b. The opposite ends of the rod 5 is fixed by fixing mechanisms at one end 10a and at the other end 10b of the support member.

More specifically, one end of the rod 5 is fixed from both sides by a part 10a of the support member 10, a washer 6I on the upper surface of the part 10a, an upper insulator 4D, an upper washer 6J, a lock nut 7F, a washer 6H on the underside of the part 10a, a lower insulator 4C, a lower washer 6G, a lower lock nut 7E. The other end of the rod 5 is fixed from both sides by a part 10b of the support member 10, a washer 6C on the upper surface of the part 10b, an insulator 4B, a washer 6D, a lock nut 7B, a washer 6B on the underside of the part 10b, an insulator 4A, a washer 6A, and a lock nut 7A. In this example, the rod 5 extends along the Z-axis.

The tuning fork comprises a vibrating sheet 15 which is fabricated by bending a metal sheet into a U-shaped form. The rod 5 extends through the central portion of the vibrating sheet 15 and holds the sheet. The cylindrical torsion detector 3 bears on the upper surface of the vibrating sheet 15. That is, the detector 3 is placed on the vibrating sheet 15 in the direction of the Z-axis.

The lower surface of the vibrating sheet 15 is supported by a washer 6E and a lock nut 7C in mesh with the thread on the rod 5 to prevent the lower surface from moving in the direction of the Z-axis. The upper surface of the torsion detector 3 is supported by a washer 6F and a lock nut 7D in mesh with the thread on the rod 5 to prevent the upper surface from shifting in the direction of the Z-axis. That is, the vibrating sheet 15 is pressed against the detector 3 by tightening the lock nuts 7C and 7D. However, the vibrating sheet 15 and the detector 3 are so held that they can slightly rotate back and forth about the Z-axis.

The tuning fork and the torsion detector 3 are locked together by the thread on the rod 5 and the nuts 7C, 7D to prevent them from moving in the direction of the Z-axis in FIG. 8. This substantially eliminates the possibility that the thicknesses of the coupled surfaces differ, unlike the case where a tuning fork and a torsion detector are bonded together with adhesive.

The vibrating sheet 15 has rectangular bent portions 15a and 15b which extend along the Z-axis. Therefore, the face of each of the two bent portions 15a and 15b are parallel to each other. The directions of thickness of the bent portions 15a and 15b lie in the direction of the Y-axis. The lateral directions of the bent portions 15a and 15b lie in the direction of the X-axis.

Square piezoelectric ceramic sheets $2B_1$ and $2C_1$ are firmly fixed to the front surface of the bent portion 15a. Likewise, square piezoelectric ceramic sheets $2B_2$ and $2C_2$ are rigidly fixed to the rear surface of the bent portion 15a. Also, piezoelectric ceramic sheets $1B_1$, $1B_2$, $1C_1$, $1C_2$ are securely fixed to the bent portion 15b. These piezoelectric ceramic sheets are polarized in their direction of thickness. By applying alternating voltage to each piezoelectric ceramic sheet, it produces a strain in the direction of thickness. Conversely, when each sheet receives a strain in the direction of thickness, it develops a voltage.

Figures 9A, 9B:
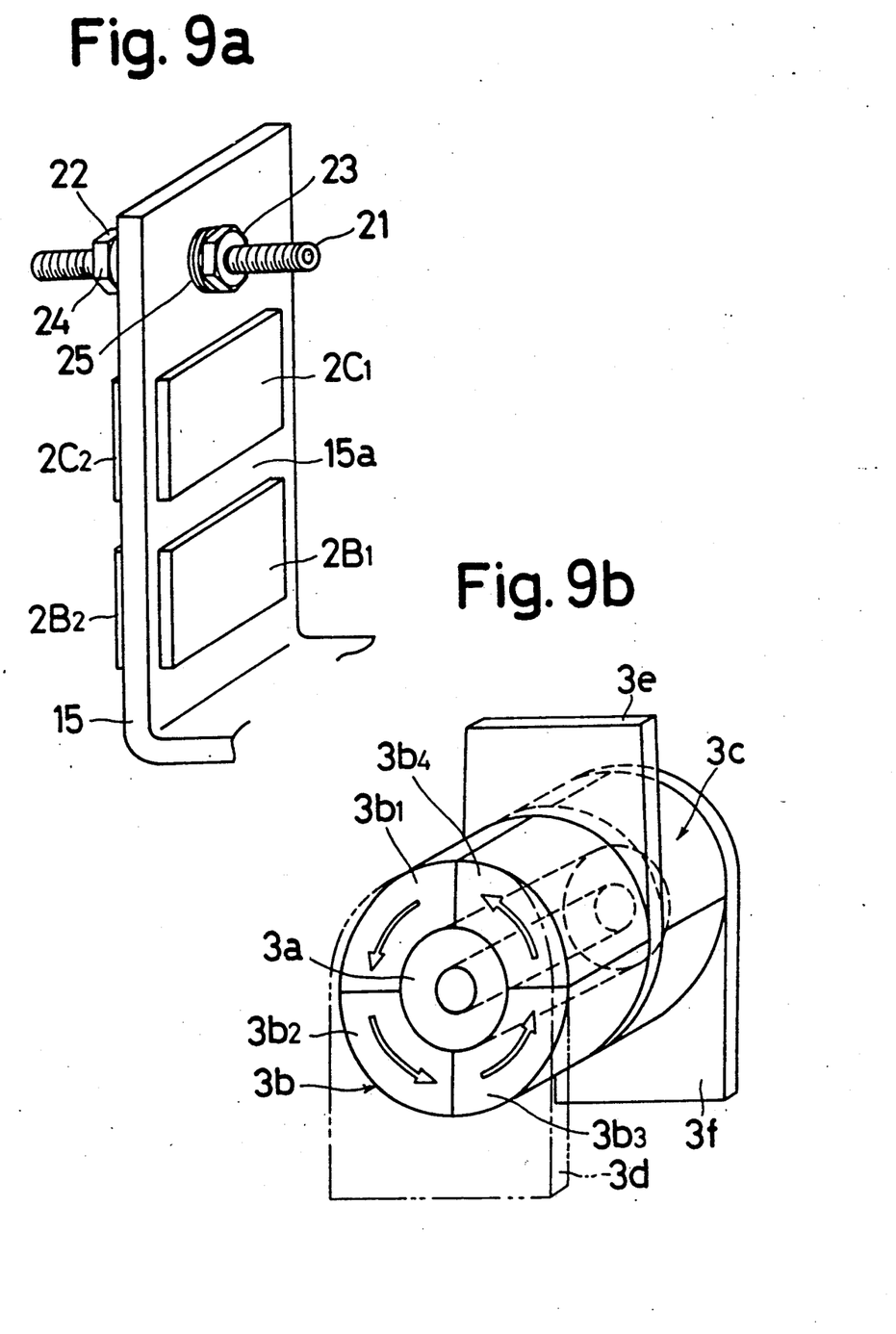
FIG. 9a is an enlarged perspective view of a portion of the apparatus shown in FIG. 8.
FIG. 9b is an enlarged perspective view of another portion of the apparatus shown in FIG. 8.

The torsion detector of FIG. 9b is the same as that of FIG. 3b. Accordingly, further description is omitted and reference is made to the description of FIG. 3b.

Figure 10A:
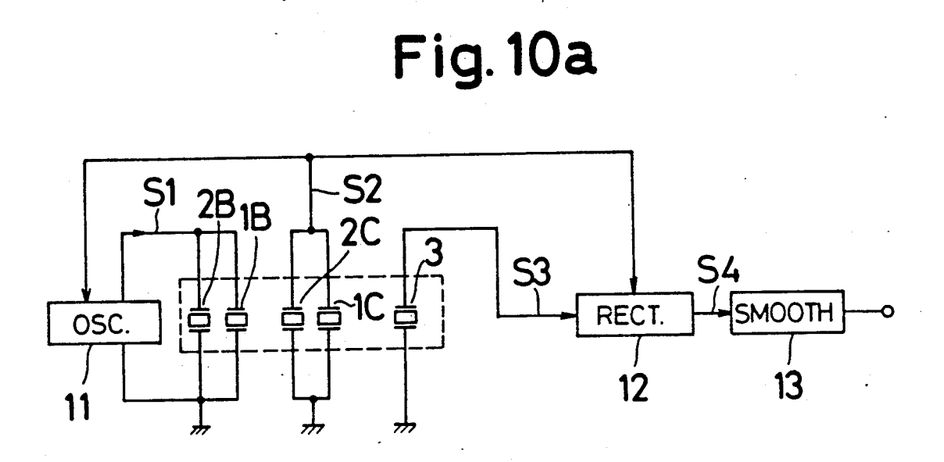
FIG. 10a is a block diagram of an electric circuit.
Figure 10B:
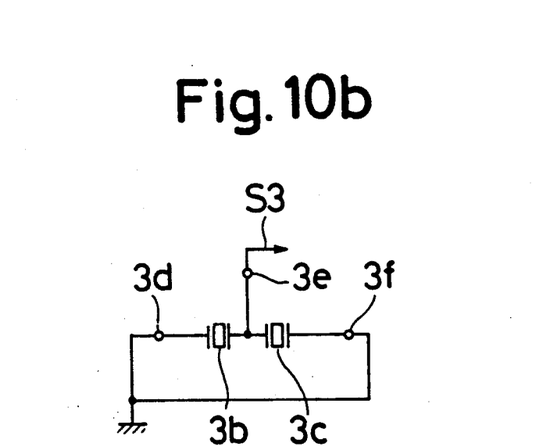

FIG. 10b is an equivalent circuit diagram of the torsion detector 3. This equivalent circuit is exactly the same as the equivalent circuit shown in FIG. 4b. In this example, the electrodes 3d is in contact with the washer 6F. The electrode 3f is in contact with the vibrating sheet 15. The insulators 4A, 4B, 4C and 4D serve to prevent mechanical vibration from being transmitted to unwanted locations.

The electric circuit of the apparatus shown in FIG. 8 is shown in FIG. 10a, where the output signal S1 from the oscillatory circuit 11 is applied as an activating signal to the piezoelectric ceramic elements 1B and 2B which drive the tuning fork. Signal S2 produced from the piezoelectric ceramic elements 1C and 2C of the tuning fork is fed back to the oscillatory circuit 11. The ceramic element 1B is a parallel combination of the piezoelectric ceramic sheets $1B_1$ and $1B_2$ shown in FIG. 1. The ceramic element 2B is a parallel combination of the piezoelectric ceramic sheets $2B_1$ and $2B_2$. The ceramic element 1C is a parallel combination of the piezoelectric ceramic sheets $1C_1$ and $1C_2$. The ceramic element 2C is a parallel combination of the piezoelectric ceramic sheets $2C_1$ and $2C_2$.

The oscillator circuit 11 delivers the activating sinusoidal signal S1 which is regulated in frequency and amplitude. Feedback signal S2 is used to stabilize the oscillation and the vibration of the tuning fork. The feedback signal S2 is also employed to synchronize the rectifier circuit 12 which processes the detected signal.

Since the piezoelectric ceramic elements 1B and 2B to which the activating sinusoidal signal S1 is applied from the oscillator circuit 11 are polarized in their direction of thickness, the activating signal S1 produces a stain in their direction of thickness. The direction of the strain is reversed periodically and so the ceramic elements vibrate in their direction of thickness. Resonating with the vibration, the bent portions 15a and 15b of the vibrating sheet 15, or the tuning fork, vibrate. Accordingly, the tuning fork vibrates in the directions indicated by the arrows Fi in FIG. 8, or in the direction of the Y-axis. The bent portions 15a and 15b vibrate in opposite direction. That is, when the bent portion 15a deflects toward the rod 5, the bent portion 15b deflects also toward the rod 5. When the bent portion 15a deflects away from the rod 5, the bent portion 15b deflects from the rod 5.

When the bent portions 15a and 15b are constantly vibrated in this way, an inertia force acts on this detecting apparatus. If this apparatus turns about the Z-axis, Coriolis forces Fc having a magnitude corresponding to the angular velocity of the rotation act on the bent portions 15a and 15b in the direction of the X-axis. The force Fc acting on the bent portion 15a is opposite in sense to the force Fc acting on the bent portion 15b. When the force Fc acting on the bent portion 15a is directed in the forward direction of the X-axis, the force Fc acting on the bent portion 15b is directed in the negative direction of the X-axis.

Thus, the vibrating sheet 15 receives a force Ft revolving around the Z-axis. This force moves the vibrating sheet 15 relative to the rod 5. The upper surface of the torsion detector 3 is fixed to the rod 5 via the washer 6F and the lock nut 7D, while the lower surface bears on the vibrating sheet 15. Therefore, when the vibrating sheet 15 receives a rotating force, the detector 3 is twisted about the Z-axis.

Since the torsion detector 3 is polarized circumferentially as described above, when it is twisted, it delivers an electrical signal corresponding to the force. Therefore, the amplitude of the signal S3 delivered from the detector 3 corresponds to the angular velocity ω around the Z-axis.

The output signal S3 from the torsion detector 3 is applied to the input terminal of the rectifier circuit 12. The feedback signal S2 is applied to the synchronizing input terminal of the rectifier circuit 12. The rectifier circuit 12 operates in the same way as the rectifier circuit 12 shown in FIG. 1.

Figure 11:
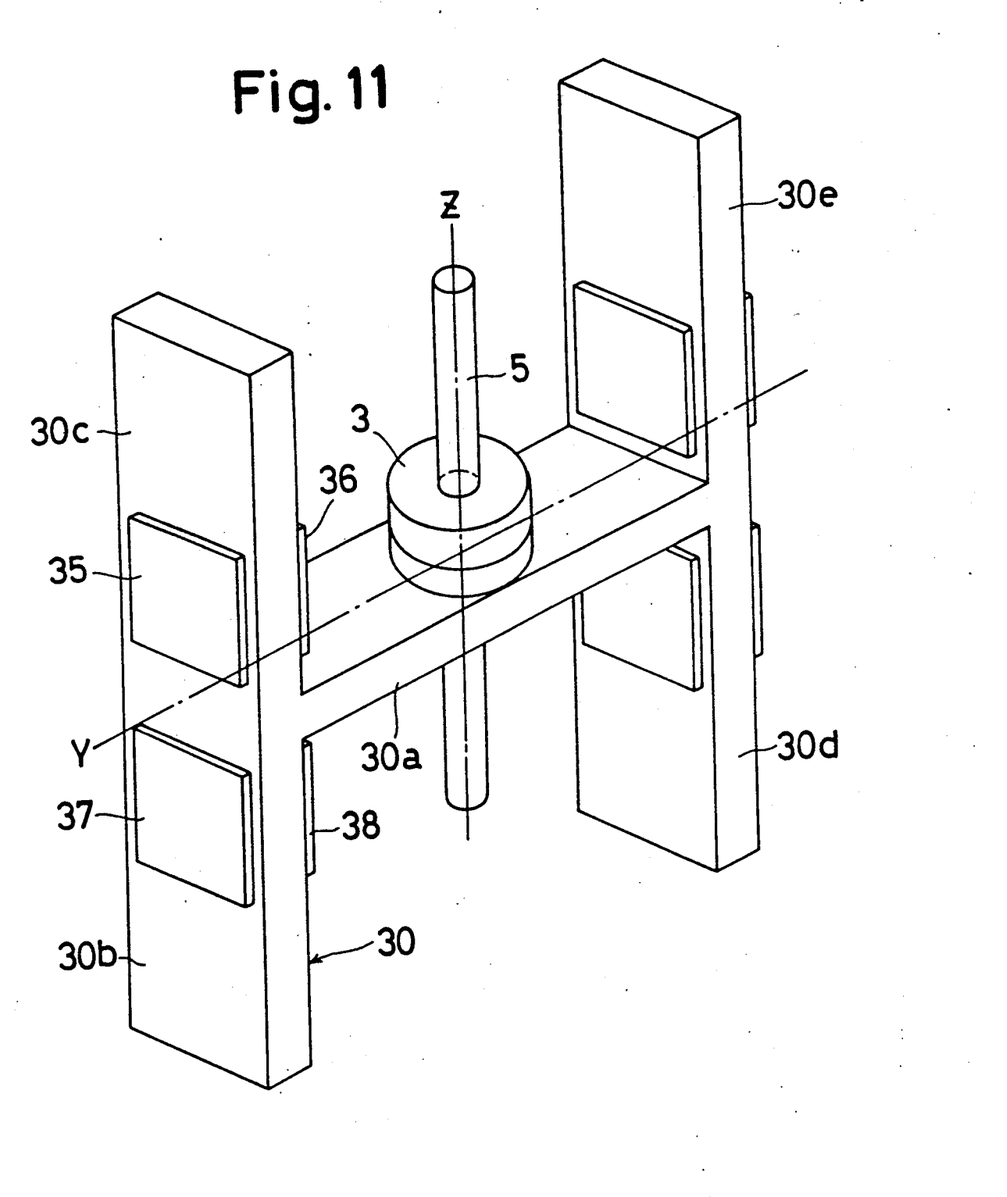
FIGS. 11 and 12 are perspective views of different tuning forks according to the invention.
Figure 12:
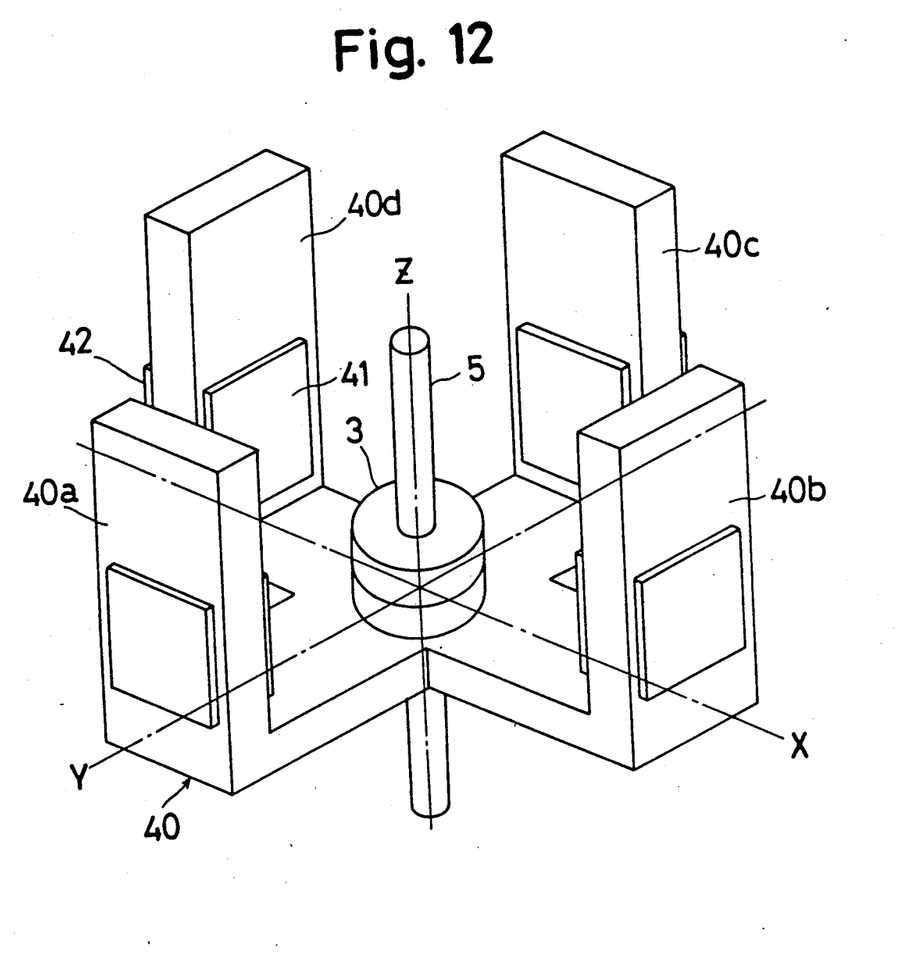

FIGS. 11 and 12 show modifications of the tuning fork. In the example shown in FIG. 11, a vibrating sheet 30 takes an H-shaped form which is symmetrical with respect to a horizontal line. Upper piezoelectric ceramic sheets 35 and 36 and lower piezoelectric ceramic sheets 37 and 38 are arranged symmetrically with respect to a support portion 30a. To achieve well-balanced vibration, these piezoelectric ceramic sheets are so arranged that the longitudinal dimension of the vibrating sheet is trisected by the sheets. As an example, the distance between the lower end of a portion 30b of the vibrating sheet 30 and the center, or the center of gravity, of the piezoelectric ceramic sheet 37, the distance between the center of the ceramic sheet 37 and the center of the sheet 35, and the distance between the center of the ceramic sheet 35 and the upper end of a portion 30c are all equal.

In the example shown in FIG. 12, a vibrating sheet 40 has a planar crisscross portion perpendicular to the Z-axis and has bent portions 40a, 40c, 40b, and 40d. The direction of thickness of the bent portion 40a and 40c lies in the direction of the Y-axis. The direction of thickness of the bent portions 40b and 40d lies in the direction of the X-axis. Piezoelectric ceramic sheets are rigidly fixed to each bent portion.

In the above examples, two or more sets of vibrating portions are provided. Since the torsional detector 3 can be twisted by only one vibration, the invention can be practiced if one of the bent portions 15a and 15b shown in FIG. 8 is omitted. Also, the invention can be carried out if at least one end of the rod 5 is supported by the support member 10.

As shown in FIG. 9a, a screw 21 and washers 24, 25 and lock nuts 22, 23 for fixing the screw 21 to the vibrating sheet 15 may be mounted close to the front end of the bent portion 15a of the vibrating sheet. This mechanism allows the center of gravity to be varied by shifting the position of the tuning fork. this makes it possible to adjust the balance of the vibration. In this configuration, the vibration of the tuning fork can be adjusted with greater ease than conventional devices.

In the above examples, the torsion-detecting arrangement is provided by piezoelectric devices. They can also be magnetic detectors, such as strain gauges, differential transformers, or magnetic heads, or detectors making use of magnetostriction.

In the present arrangement, angular velocity around the Z-axis can be detected as a twist around the Y-axis by vibrating the vibrating sheets 1 and 2 in the direction of the Y-axis in FIG. 1. The torsion-detecting means is required to detect only twist around the Y-axis and so the apparatus can be designed not to respond to forces other than the detected angular velocity around the Z-axis, i.e., not to respond to accelerations supplied in the X, Y and Z-axes. Consequently, when it is subjected to an external rectilinear force, the angular velocity can be detected with very small error. Furthermore, the directions of vibration of the vibrating sheets lie in the direction of the Y-axis, whereas the torsion-detecting means detects circumferential movement. Hence, even if the vibration of the vibrating sheets is transmitted to the torsion-detecting means, the output signal from the apparatus is not affected. In this way, no error is produced in detection of the signal.

Since the circumferentially polarized piezoelectric devices are used as the torsion-detecting means, the detecting characteristics drift only a little with temperature. Specifically, as temperature varies, noise voltage appears on the polarized surface of a piezoelectric device due to pyroelectricity. Because the electrode for receiving the signal is disposed in the direction of thickness of the piezoelectric device, the noise voltage is not superimposed on the output signal. Consequently, the output signal is not affected by temperature changes. If the piezoelectric device receives strains produced in the direction of thickness and in a radial direction, respectively, no voltage is developed. Hence, the apparatus is not affected by rectilinear accelerations acting along the X, Y, and Z-axes in the device of FIG. 1.

In addition, since two sets of vibrating members are substantially symmetrically disposed with respect to the axis of rotation, or the Z-axis, of the detected object, an externally applied rectilinear acceleration acts on the two sets of vibrating members from opposite directions so as to twist the torsion-detecting means. Therefore, the acceleration cancels out and does not affect the output signal from the detector. For this reason, when the apparatus is subjected to an external force other than the rotation of the detected object, the error of detection is quite small.

Since the vibrating member is of rectangular or crisscross form, the vibrational mode is uniform in each vibrating portion. This reduces unwanted vibration which introduces error to the result of measurement. Also, the balance of the vibration is stable because the driving means is located in the center or symmetrically.

Angular velocity ω around the Z-axis can be detected as a twist around the Z-axis by vibrating the vibrating sheet 15 in the direction of the Y-axis in FIG. 8. The torsion-detecting means is required to detect only torsion around the Z-axis and so the apparatus can be designed not to respond to forces other than the detected angular velocity around the Z-axis, i.e., not to respond to accelerations applied in the X, Y and Z-axes. Consequently, if it is subjected to an external rectilinear force, the angular velocity ω can be detected with very small error. Furthermore, the direction of the vibrating member lies in the direction of the Y-axis in FIG. 8, whereas the torsion-detecting means detects circumferential movement. Hence, even if the vibration of the vibrating member is transmitted to the torsion-detecting means, the output signal from the apparatus is not affected.

Further, since the vibrating portions on the vibrating member are substantially symmetrically arranged with respect to the axis of rotation, or the Z-axis, of the detected object, an externally applied rectilinear acceleration acts on the two similar vibrating portions along the X-axis from opposite directions so as to twist the torsion-detecting means. Therefore, the acceleration cancels out and does not affect the output signal from the detector. For this reason, when the apparatus is subjected to an external force other than the rotation of the detected object, the error of detection is quite small.

The vibrating member is rectangular in shape. Accordingly, the vibrational mode if uniform in each vibrating portion. This reduces unwanted vibration which introduces error to the result of measurement.

The vibrating member can be substantially H-shaped and is supported on the connector member in its center, or the center of gravity. Therefore, the balance of the vibration is good. This reduces the unwanted mechanical vibration transmitted to the connector member from the vibrating member.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An apparatus for detecting rotation, comprising:
   a support member;
   a connector member at least one end of which is supported on the support member;
   a vibrating sheet member connected to the connector member;
   a plurality of piezoelectric members supported on the support member;
   driving means rigidly fixed to the vibrating member;
   torsion-detecting means for detecting rotation between the connector member and the vibrating member by detecting angular movement of the piezoelectric members; and
   activating means for activating the driving means to vibrate the vibrating member.

2. An apparatus for detecting rotation, comprising:
   a support member;
   a rodlike connector member at least one end of which is connected to the support member;
   a vibrating plate member connected to the connector member;
   driving means rigidly fixed to the vibrating member;
   torsion-detecting means for detecting torsional strain transmited to the connector member, said tocsin-detecting means including a plurality of circumferentially polarized piezoelectric devices stacked on top of each other and having electrodes disposed centrally and at axial ends of the devices; and
   activating means for activating the driving means to vibrate the vibrating member axially of the connector member.

3. An apparatus for detecting rotation, comprising:
   a support member;
   a rodlike connector member both ends of which are supported on the support member;
   two sets of vibrating sheet members secured to the connector member at different axial positions;
   driving means rigidly fixed to each of the vibrating members;
   torsion-detecting means positioned between the two sets of vibrating members for detecting torsional strain of the connector member; and
   activating means for activating the driving means to vibrate the vibrating member axially of the connector member.

4. An apparatus for detecting rotation as set forth in claim 3, wherein
   (A) the torsion-detecting means is positioned between the two sets of vibrating members;
   (B) an outer of each vibrating member is fixed to the connector member; and
   (C) the torsion-detecting means and the two sets of vibrating members are mounted to the connector member.

5. An apparatus for detecting rotation as set forth in claim 2, wherein said vibrating member comprises a securing means for securing the vibrating member in the direction of thickness.

6. An apparatus for detecting rotation as set forth in claim 2, wherein said vibrating member has a planar rectangular portion, and wherein the driving means is rigidly fixed to the center of the planar portion.

7. An apparatus for detecting rotation as set forth in claim 2, wherein said vibrating member has a planar rectangular portion fixed to the connector member at its center portion, and wherein a plurality of vibrating means are arranged symmetrically with respect to said center portion.

8. An apparatus for detecting rotation as set forth in claim 2, wherein said vibrating member has a planar crisscross portion fixed to the connector member at its center portion, and wherein at least four vibrating means are arranged symmetrically with respect to said center.

9. An apparatus for detecting rotation, comprising:
   a support member;
   a rodlike connector member, at least one end of which is supported on the support member;
   a vibrating member having a portion fixed to the connector member, the vibrating member being so disposed that its direction of thickness is parallel to the longitudinal direction of the connector member, the vibrating member having vibrating portions at each end of the vibrating member and a planar rectangular portion fixed to a central portion of the connector member;
   torsion-detecting means for detecting rotation between the connector member and the vibrating member; and
   activating means for activating the driving means to vibrate the vibrating member in the direction of thickness.

10. An apparatus for detecting rotation, comprising:
    a support member;
    a rodlike connector member at least one end of which is supported on the support member;
    a plurality of piezoelectric members supported on the support member;
    a vibrating member fixed to the connector member and having at least one pair of vibrating plate portions on opposite sides of the connector member; a plurality of driving means rigidly fixed to vibrating portions of the vibrating member;

torsion-detecting means for detecting rotation between the connection member and the vibrating member by detecting angular movement of the piezoelectric members; and activating means for activating the driving means to vibrate the vibrating portions of the vibrating member toward and away from each other.

11. An apparatus for detecting rotation as set forth in claim 9, wherein said torsion-detecting means is annular in shape and comprises a plurality of circumferentially polarized piezoelectric devices stacked on top of each other in their axial direction and electrodes disposed in the axial center and at the axial ends.

12. An apparatus for detecting rotation as set forth in claim 9, wherein said connector member is a bolt, and wherein an outside portion of the torsion-detecting means and an outside portion of the vibrating member of the torsion-detecting means and an outside portion of the vibrating member are tightened by nuts to mount the torsion-detecting means and the vibrating means to the connector member.

13. An apparatus for detecting rotation as set forth in claim 9, wherein said vibrating member comprises a screw and a plurality of nuts into which the screw is threaded to fix the screw extending through the vibrating member in the direction of thickness.

14. An apparatus for detecting rotation, comprising:
a support member;
a rodlike connector member at least one end of which is supported on the support member;
a vibrating member having a portion fixed to the connector member, the vibrating member being so disposed that its direction of thickness is parallel to the longitudinal direction of the connector member, the vibrating member having vibrating portions of the vibrating member;
torsion-detecting means for detecting rotation between the connector member and the vibrating member; and
activating means for activating the driving means to vibrate the vibrating member in the direction of thickness wherein said connector member is substantially H-shaped and has a central portion fixed to the connector member.

* * * * *